(12) United States Patent
Geiger et al.

(10) Patent No.: US 10,499,136 B2
(45) Date of Patent: Dec. 3, 2019

(54) PROVIDING ISOLATION FROM DISTRACTIONS

(71) Applicant: Bose Corporation, Framingham, MA (US)

(72) Inventors: Joseph M. Geiger, Clinton, MA (US); Muhammad Masood, Waltham, MA (US); Daniel M. Gauger, Jr., Berlin, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/790,755

(22) Filed: Oct. 23, 2017

(65) Prior Publication Data

US 2018/0048955 A1 Feb. 15, 2018

Related U.S. Application Data

(60) Division of application No. 15/195,358, filed on Jun. 28, 2016, now Pat. No. 9,832,559, which is a
(Continued)

(51) Int. Cl.
*H04R 1/10* (2006.01)
*H04M 1/02* (2006.01)
(Continued)

(52) U.S. Cl.
CPC ........... *H04R 1/1041* (2013.01); *G06F 3/162* (2013.01); *G06F 3/167* (2013.01); *G08B 1/08* (2013.01);
(Continued)

(58) Field of Classification Search
CPC combination set(s) only.
See application file for complete search history.

(56) References Cited

U.S. PATENT DOCUMENTS 8,593,501 B1 * 11/2013 Kjeldaas ................. H04N 7/15
348/14.01
2004/0189475 A1 9/2004 Cooper et al.
(Continued)

FOREIGN PATENT DOCUMENTS

CN 102970633 A 3/2013
GB 2320117 A 6/1998
(Continued)

OTHER PUBLICATIONS

Lync Quick Reference Guide, CR 2012.*
(Continued)

*Primary Examiner* — Phung-Hoang J Nguyen
(74) *Attorney, Agent, or Firm* — Brian M. Dingman; Dingman IP Law, PC

(57) ABSTRACT

An apparatus includes a first interface for connecting to a personal computer, a second interface for connecting to a communications device, a third interface for connecting to a headset, a fourth interface for connecting to a speaker, and a processor in control of each of the interfaces. The processor is configured to route audio associated with a communications session on one of the personal computer or the communications device to the speaker, and in response to a user putting on the headset, re-route the audio to the headset.

13 Claims, 3 Drawing Sheets

Related U.S. Application Data continuation of application No. 14/684,829, filed on Apr. 13, 2015, now Pat. No. 9,407,738.

(60) Provisional application No. 61/979,120, filed on Apr. 14, 2014.

(51) Int. Cl.

| | | |
|---|---|---|
| *H04N 7/14* | (2006.01) | |
| *H04W 4/38* | (2018.01) | |
| *G10K 11/175* | (2006.01) | |
| *H04R 5/04* | (2006.01) | |
| *G02B 1/08* | (2006.01) | |
| *H04M 3/56* | (2006.01) | |
| *G06F 3/16* | (2006.01) | |
| *G10L 15/26* | (2006.01) | |
| *G10L 17/06* | (2013.01) | |
| *H04W 4/16* | (2009.01) | |
| *G08B 1/08* | (2006.01) | |

(52) U.S. Cl.
CPC ............ *G10K 11/175* (2013.01); *G10L 15/26* (2013.01); *G10L 17/06* (2013.01); *H04M 1/0258* (2013.01); *H04M 3/56* (2013.01); *H04M 3/567* (2013.01); *H04M 3/568* (2013.01); *H04N 7/141* (2013.01); *H04R 1/1083* (2013.01); *H04R 5/04* (2013.01); *H04W 4/16* (2013.01); *H04W 4/38* (2018.02); H04M 2203/2072 (2013.01); H04R 2420/03 (2013.01); H04R 2420/05 (2013.01); H04S 2400/13 (2013.01)

(56) References Cited

U.S. PATENT DOCUMENTS

| | | | | |
|---|---|---|---|---|
| 2006/0109983 | A1* | 5/2006 | Young | H04K 3/43 380/252 |
| 2006/0262938 | A1* | 11/2006 | Gauger, Jr. | G10L 21/02 381/56 |
| 2008/0319745 | A1* | 12/2008 | Caldwell | H04M 1/2475 704/235 |
| 2009/0220064 | A1* | 9/2009 | Gorti | H04M 3/56 379/202.01 |
| 2010/0018382 | A1* | 1/2010 | Feeney | A63H 5/00 84/615 |
| 2011/0235813 | A1* | 9/2011 | Gauger, Jr. | G10L 21/02 381/57 |
| 2012/0230509 | A1* | 9/2012 | Hagglund | H04R 1/1041 381/74 |
| 2012/0244812 | A1 | 9/2012 | Rosener | |
| 2012/0289213 | A1 | 11/2012 | Levien et al. | |
| 2013/0183901 | A1* | 7/2013 | Joergensen | H04M 1/57 455/41.2 |
| 2014/0037101 | A1 | 2/2014 | Murata et al. | |
| 2014/0072126 | A1* | 3/2014 | Uhle | H04S 5/005 381/56 |
| 2014/0169573 | A1* | 6/2014 | Terrel | H04R 3/04 381/58 |
| 2014/0233716 | A1* | 8/2014 | Villette | H04M 3/568 379/202.01 |
| 2017/0111614 | A1* | 4/2017 | Tong | H04M 1/72555 |

FOREIGN PATENT DOCUMENTS

| | | |
|---|---|---|
| JP | 2006-267174 | 10/2006 |
| JP | 2009-232302 | 8/2009 |
| JP | 2011-114677 | 6/2011 |
| JP | 2012-173630 | 9/2012 |
| JP | 2013-051532 | 3/2013 |
| JP | 2014-033303 | 2/2014 |

OTHER PUBLICATIONS

Office Action issued by the Japanese Patent Office dated Sep. 25, 2017 for JP Application No. 2016-562544.
Office Action issued by the European Patent Office dated Nov. 17, 2017 for EP Application No. 15 719 074.5-1914.
Office Action issued by the Japanese Patent Office drafted Sep. 25, 2018 for JP Application No. 2017-246089.
English Translation of Office Action issued by the Japanese Patent Office drafted Sep. 25, 2018 for JP Application No. 2017-246089.
Published Japanese Translation No. 2008-546003 of the PCT International Publication.
Office Action issued by the Chinese Patent Office dated Apr. 1, 2019 for CN Application No. 201580026117X.
English Translation of Office Action issued by the Chinese Patent Office dated Apr. 1, 2019 for CN Application No. 201580026117X.

* cited by examiner

PROVIDING ISOLATION FROM DISTRACTIONS

PRIORITY CLAIM

This application is a divisional of and claims priority to U.S. patent application Ser. No. 15/195,358, filed on Jun. 28, 2016, which is a continuation of and claims priority to U.S. patent application Ser. No. 14/684,829, filed on Apr. 13, 2015, which claims priority to U.S. provisional application 61/979,120, filed Apr. 14, 2014, each of which is incorporated herein by reference in its entirety.

BACKGROUND

This disclosure relates to personal audio devices that provide context-sensitive isolation from distracting noises.

SUMMARY

In general, in one aspect, an apparatus includes a first interface for connecting to a personal computer, a second interface for connecting to a communications device, a third interface for connecting to a headset, a fourth interface for connecting to a speaker, and a processor in control of each of the interfaces. The processor is configured to route audio associated with a communications session on one of the personal computer or the communications device to the speaker, and in response to a user putting on the headset, re-route the audio to the headset.

Implementations may include one or more of the following, in any combination. The processor may be configured to, in response to the user taking off the headset, mute the audio. The processor may also be configured to re-route the audio back to the speaker in response to the user taking off the headset. The processor may be further configured to, in response to the communications device being connected to the second interface while a call is active on the communications device, re-route audio from an audio interface of the communications device to one of the speaker or headset, and cause the personal computer to connect to the call and cause the communications device to disconnect from the call. The processor may be further configured to cause the personal computer to connect to the call that is active on the communications device, and cause the communications device to disconnect from the call. The processor may be further configured to cause the personal computer to display video associated with the call, and to transmit video from a camera local to the apparatus. The apparatus may include the camera. The first interface includes an interface for receiving video images from the camera, the camera being connected to the personal computer. The processor may be further configured to, while a call is active on the personal computer, re-route audio from an audio interface of the personal computer to one of the speaker or headset, and cause the communications device to connect to the call and cause the personal computer to disconnect from the call. The personal computer may be a tablet computer. The communications device may be a second tablet computer. The communications device may be integrated into the apparatus. At least one of the first, second, third, or fourth interface may be a wireless interface, and the routing may be performed based on proximity between the device using the wireless interface and the apparatus. The speaker and the fourth interface may be internal to the apparatus.

In general, in one aspect, an apparatus includes a first interface for connecting to a headset, a second interface for connecting to a speaker, and a processor in control of each of the interfaces. The processor is configured to route audio providing masking of the voice of a user of the headset to the speaker, and in response to a user putting on the headset, activate a noise cancellation signal within the headset to reduce the amount of the privacy masking audio that reaches the ears of the user.

In general, in one aspect, an apparatus includes a first interface for connecting to an audio source, a second interface for connecting to an audio output device, an external activity sensor input, and a processor in control of each of the interfaces and receiving the input. The processor is configured to provide audio from the audio source to the audio output device, and in response to receiving an input from the external activity sensor, modify the audio being provided to the audio output device.

Implementations may include one or more of the following, in any combination. The external activity sensor may include a doorbell or an intruder sensor. The first interface and the audio source may be internal to the apparatus. The audio source includes a stored isolation masking sound, and the processor modifies the isolation masking sound by gradually reducing its level. The stored isolation masking sound may be stored in the headset, and provided to the apparatus to be modified. The processor may also provide an alert sound after reducing the level of the masking sound. A do-not-disturb indicator may be in communication with the processor, with the processor configured to respond differently to the external activity sensor input based on an activation state of the do-not-disturb indicator. The do-not-disturb indicator may be activated whenever the pre-determined type of audio is being provided by the audio source. The predetermined type of audio may include isolation masking or a phone call. A third interface may be included for connecting to a computing device, with the do-not-disturb indicator activated whenever a particular software application is used on the computing device. The apparatus may have access to calendar data, with the do-not-disturb indicator activated when the calendar data indicates that a user of the hub may have an activity scheduled. The processor may be configured to cause the do-not-disturb indicator to change its appearance in response to the external activity sensor input being received while the do-not-disturb indicator may be active.

In general, in one aspect, an apparatus includes a first interface for connecting to a communications device, a second interface for connecting to an audio output device, and a processor in control of each of the interfaces. The processor is configured to, upon initiation of a multiple-participant communication session through the communication device, begin analyzing speech from remote participants of the session to produce a voice fingerprint for each remote participant, use a speech-to-text process to identify likely text corresponding to each participants' name, and associate the identified speech with the voice fingerprint produced for each corresponding participant. When a participant speaks during the communication session a time subsequent to the time their voice fingerprint and likely name was determined, the processor provides an indication to a user of the apparatus of the speaking participant's likely name.

Advantages include providing a seamless interface into audio/video sources used in an individual workspace. The combination of the hub and headset also provide a "virtual door" that people who work in open-plan or cubicle work environments can use to facilitate productivity by isolating them from distractions when desired, signaling their availability (or not) for interruption, and providing a polite way of getting the wearer's attention. Isolation and signaling of availability are also beneficial in private offices. These functions enhance productivity and reduce stress as well as improving the effectiveness of workplace interactions, giving the user more control of their environment.

All examples and features mentioned above can be combined in any technically possible way. Other features and advantages will be apparent from the description and the claims.

DESCRIPTION

Described below is a communications hub that simplifies the office workspace. By providing unified speakers and headphones, it seamlessly enables the user to manage communications audio and video from a computer, desk phone, or other communication device, and music from their computer, smart phone, or other sources with a simple set of intuitive controls. It also provides tools that reduce workplace distractions to help the user stay focused while still giving them awareness of the activity going on around them.

Figure 1:
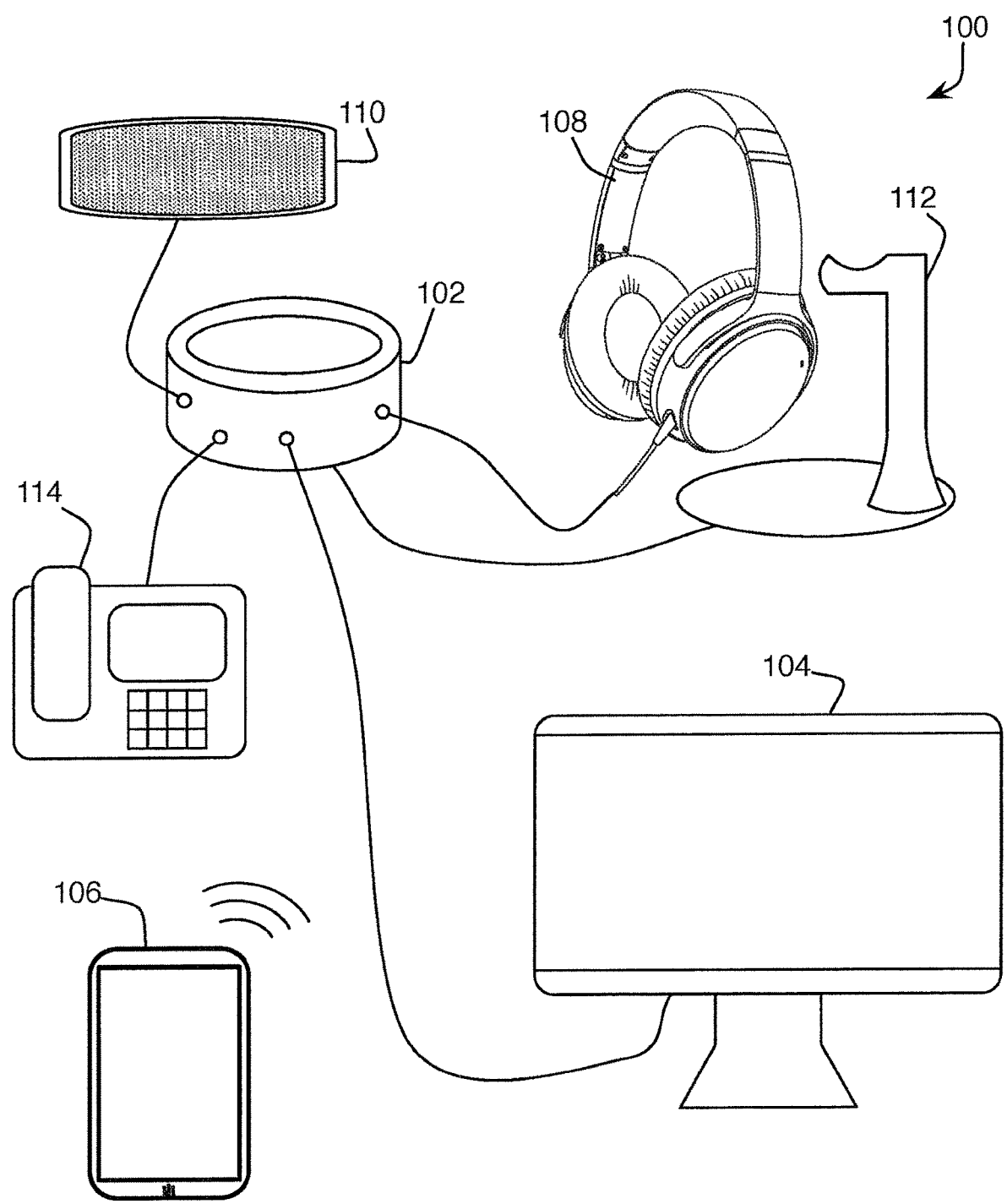
FIG. 1 a system of interconnected devices.

As shown in FIG. 1, the system 100 includes a central hub 102 that is simultaneously connected to a workstation 104 such as a personal computer, a communication device 106 such as a cell phone, and a headset 108. Although shown as a piece of hardware connected to the other devices by wires, the hub may also be implemented entirely as software in one or more of the devices. That software may be a dedicated application, or it may be a service provided within another application, such as a connected device manager or communications software. A holder 112 for the headset may monitor whether the headset is in use and may provide charging if the headset is battery-powered. The system may also include a desktop phone 114, which may be connected to a dedicated telecommunication network or may be, e.g., an IP phone using the same network as the other devices for connectivity. The various connections can each be wired or wireless, using any standard connection that carries appropriate signals, such as USB, Bluetooth, WiFi, analog connections, or proprietary interfaces.

The hub may also connect to an out-loud speaker 110 or it may be incorporated within such a speaker itself, or within one of the other connected devices, i.e., the workstation or communication device. In some examples, the hub, the device on which the hub software is running, or another portable speaker (not shown) has speakers that are adequate for out-loud listening, and the out-loud speaker 110 provides better or louder sound quality when combined with the hub or portable speaker. The out-loud speaker may also serve as a dock for the hub, charging it when present, but allowing it to be removed and carried to other locations. This is particularly useful where the hub is integrated into a mobile phone or portable speaker. In some cases, the workstation and the communication device are both multi-function portable computers, and the only real distinction between them is size, ownership, the networks they are connected to, or the primary use that the user makes of each of them.

The headset may, in some cases, be an active noise reducing headset and also preferably includes an ambient noise rejecting voice microphone (e.g., cardioid or dipole, or internal to the headset to reduce exposure to ambient noise).

A directional microphone, which may include a microphone array, may be included in the hub, one of the other devices, such as the workstation 104, or independently from the other devices, to pick up the user's voice when not using the headset. Through the workstation, the headset or out-loud speaker and microphone can be used to listen to music or the audio from video, or engage in calls, such as VoIP calls or video calls, made through the workstation. The headset and out-loud speaker may also be used with the desk phone. The headset or out-loud speaker and microphone are also used to listen to music or engage in calls on the communication device. The headset or speaker may also be used to listen to the audio associated with other video content on the workstation or communication device. The hub allows the headset or out-loud speaker and microphone to switch seamlessly between the workstation, the phone, and the communication device, either to switch activities or to transition a given activity from one device to the other, as described in several examples below. The hub also allows the user to switch seamlessly between the headset, the out-loud speaker and microphone, and any interfaces built-in to the communication device for a given activity. In addition to being used for communication and entertainment, the headset is also used to reduce distraction from the voices of people around the user, as also described in examples below.

In some examples, the hub includes a built-in user interface. The user interface can provide control of music playback on the workstation or the communications device. Various protocols exist for such control, depending on how the hub is connected to the other devices. For example, over a USB connection, keyboard commands could correspond to media keys on a keyboard or letter and number keys associated with particular commands in software running on the workstation. Bluetooth provides remote control functions such as the audio-video remote control profile (AVRCP), serial port profile, and proprietary profiles. The user interface may include a touch surface, using swiping gestures such as swiping to the right to skip a track, to the left to restart, tapping to pause. The interface can also include a display of the music or masking track being played, and can also provide caller ID information for phone, VoIP, or video calls.

Call Management

Figure 2:
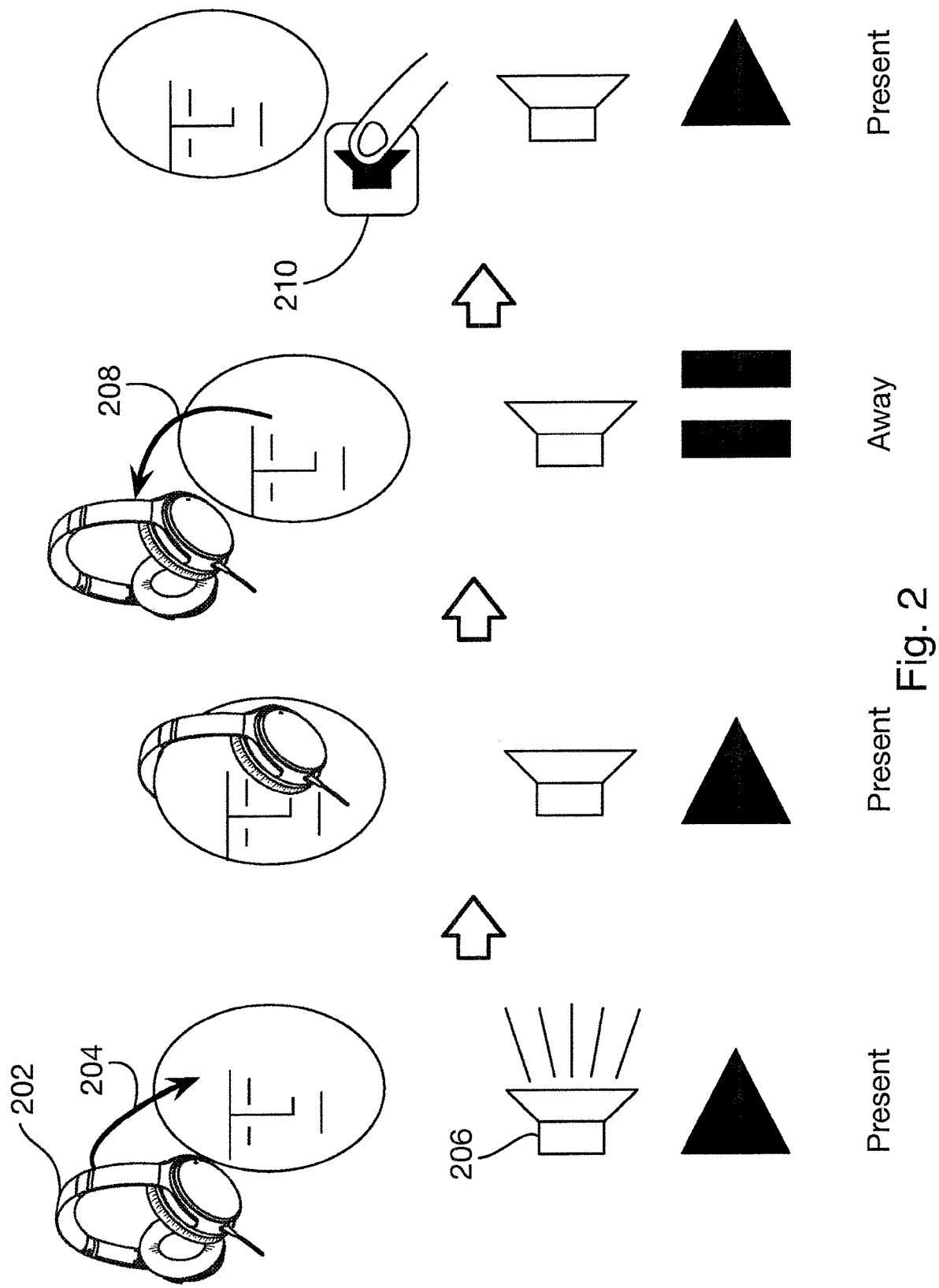
FIGS. 2 and 3 show process flows for devices and actions.

In one example, calls are automatically switched between the headset and other available interfaces. FIG. 2 shows an example process flow. The hub (not shown) senses when the headset 202 has been picked up or, alternatively, placed on the head (arrow 204), as shown in the top row, and responds by causing audio from calls to automatically be routed to the headset and muting the out-loud speaker 206, as shown in the second row, or the interface built-in to the communication device, i.e., a telephone receiver or mobile phone itself. Conversely, at the end of the call, when the headset is removed (arrow 208), sometimes referred to as "doffed", the out-loud speaker 206 remains muted, so that the audio isn't played out loud, bothering neighbors, unless the user manually un-mutes it, with an interface control 210. Similarly, if the user is listening to music or masking sounds through the headset (as described below), when the headset is doffed, the music is paused (such as by transmitting an appropriate remote control signal to whichever of the workstation or communication device is providing it), as shown in the third row, or the masking is muted, rather than being switched to the speaker, again to avoid bothering neighbors. If the user takes off the headset in the middle of a call, a status indicator to other users in the call may automatically indicate that the user stepped away, as shown in the fourth row, until the user un-mutes the out-loud speaker or puts the headset back on.

The sensing of whether the headset is being used may be accomplished by providing a resting place for the headset, e.g., a pad to place it on or hook to hang it from, equipped with sensors. In other examples, the sensing may be done using sensors within the headset that signal back to the hub, or by analyzing the signals being delivered to the headset, as described in U.S. patent application Ser. No. 14/231,524, filed Mar. 31, 2014, incorporated here by reference. Of course, knowing whether the headset is in use can also be used to automatically power the headset on and off, preserving battery power, for headsets that have batteries. In active headsets that use a wired connection to charge a battery for un-tethered use, knowing whether the headset is in use while using the wired connection can also control charging—only charging the headset while it is not in use, for example, for safety reasons.

In one product-usage scenario, a user starts her day taking a conference call while driving to work. She gets to work and walks into the building while still on the call. Once in her cubicle, she taps a control on her hub to instantly transfer the call audio from her cellphone to the hub's speakers. She gets her laptop setup and takes the wireless headphones off the charging hook. They automatically power up and mute the speakers when she puts them on. The hub switches the call from the user's cellphone to a video call through her laptop. In some examples, the headphones provide binaural audio signals, matched with spatial information in the incoming call audio, for example as described in U.S. Patent application publication 2014/0126756, incorporated here by reference.

The remote team on the call informs the user of a problem they need help solving. The user asks her co-workers in the next cubicle to come help her. When they arrive, she removes her headphones. They automatically power off and the call audio is now playing through the hub's speaker so they can all discuss the problem with the remote team. They hear the remote team in stereo and can follow the conversation, even with multiple people talking at the same time. The local team decides they need to use a large whiteboard in a nearby room. The user takes her hub with them, to continue the conference in the nearby room. In addition to maintaining the audio on the hub, the video call resumes on the room's projector, and the hub uses a video feed from a camera in the room to provide local video to the remote participants. They soon find a solution and the user returns to her cubicle. The user puts her headphones back on and resumes her meeting with the video portion on her workstation monitor so as not to disturb others nearby.

The remote team is screen-sharing a document. The user wants to print it, and write comments while listening to the team collaborate. Without leaving the conversation, she walks to the printer. She taps the mute control on her headphones so the noise of the printer doesn't interfere with the call. She un-mutes it quickly when someone on the call asks her a questions and then mutes again as she walks back to her desk.

A few minutes later the user interface on the hub indicates the Sales Director is calling into the user's cellphone. The user asks the remote team to hang on a moment and taps the source selector on the unit to answer her cellphone. The sales director has some important info for the team and wants the user to bridge him into the video call. The hub joins the two calls and the sales director presents the information to the entire team then leaves the call.

Masking

In one example, to provide isolation from the distraction of nearby conversations, such as co-workers in adjacent offices, cubicles, or open office environments, the hub provides an isolation masking signal that has a spectrum matching the long-term average spectrum of human speech, adjusted for the attenuation response of the headset itself, as described in U.S. patent application Ser. No. 14/225,807, filed Mar. 26, 2014, incorporated here by reference. The isolation signal may also be provided by the headset itself, or, in some cases, the headset may inform the hub of its attenuation response, or other identifying information, so that the hub can tailor the isolation masking signal. This signal may be an equalized nature sound track. The track to be used may be one of several that the user can select. The level of the isolation masking can be manually set or, as described in the above-referenced application, the signal may be automatically adjusted to a level that is just loud enough to provide the desired isolation. The ambient noise measure needed for automatic masker level adjustment can come from a microphone on the headset or on the hub.

The hub's output management features may influence the sound of the isolation masking signal. For example, the hub switches the isolation masking signal between the speaker and the headset based on whether the user is wearing the headset. If masking is being played on the speaker and the user puts on the headset, the isolation masking sound is re-routed to the headset. When the user takes the headset off, the isolation masking may be returned to the speaker, or it may be muted. When switching between the headset and speaker, the isolation masking sound may be changed in level or spectrum to account for the different masking properties of sound played over the headset versus sound played from the out-loud speaker. In some examples, the out-loud masking signal is not for the benefit of the user, but for those around her. This privacy masking signal is tuned based on the user's voice, to mask her voice against eavesdropping (intentional or accidental) by degrading intelligibility, as well as being masked against disturbing neighbors. The noise-reducing signals in the headset can at least partially remove the masking signal, so it doesn't distract the user herself.

In one product-usage scenario, three of the user's co-workers are having an impromptu meeting in the next cubicle making it difficult for the user to concentrate on her work. She puts on her wireless headphones and enables the isolation masking feature. She hears a trickling stream ramp up in her headphones as the perceived sounds of her co-workers fade away. She decides she wants a different masking sound so she presses a button on the hub to toggle through different sounds. The display shows the name of each as she selects it. She finds one called "At The Beach" and returns to work.

At the end of her day, the user doesn't feel fatigued even though she has been wearing headphones for much of the time. She will be working from home tomorrow so she packs her wireless headphones in with her laptop and heads home for the day.

Doorbell and DND

In another example, a doorbell is mounted at the entrance to the user's cubicle or on the back of their chair. This can be used to signal the user, when wearing the headset and listening to music, masking distractions, or on a call, that a visitor wants to interrupt them.

Figure 3:
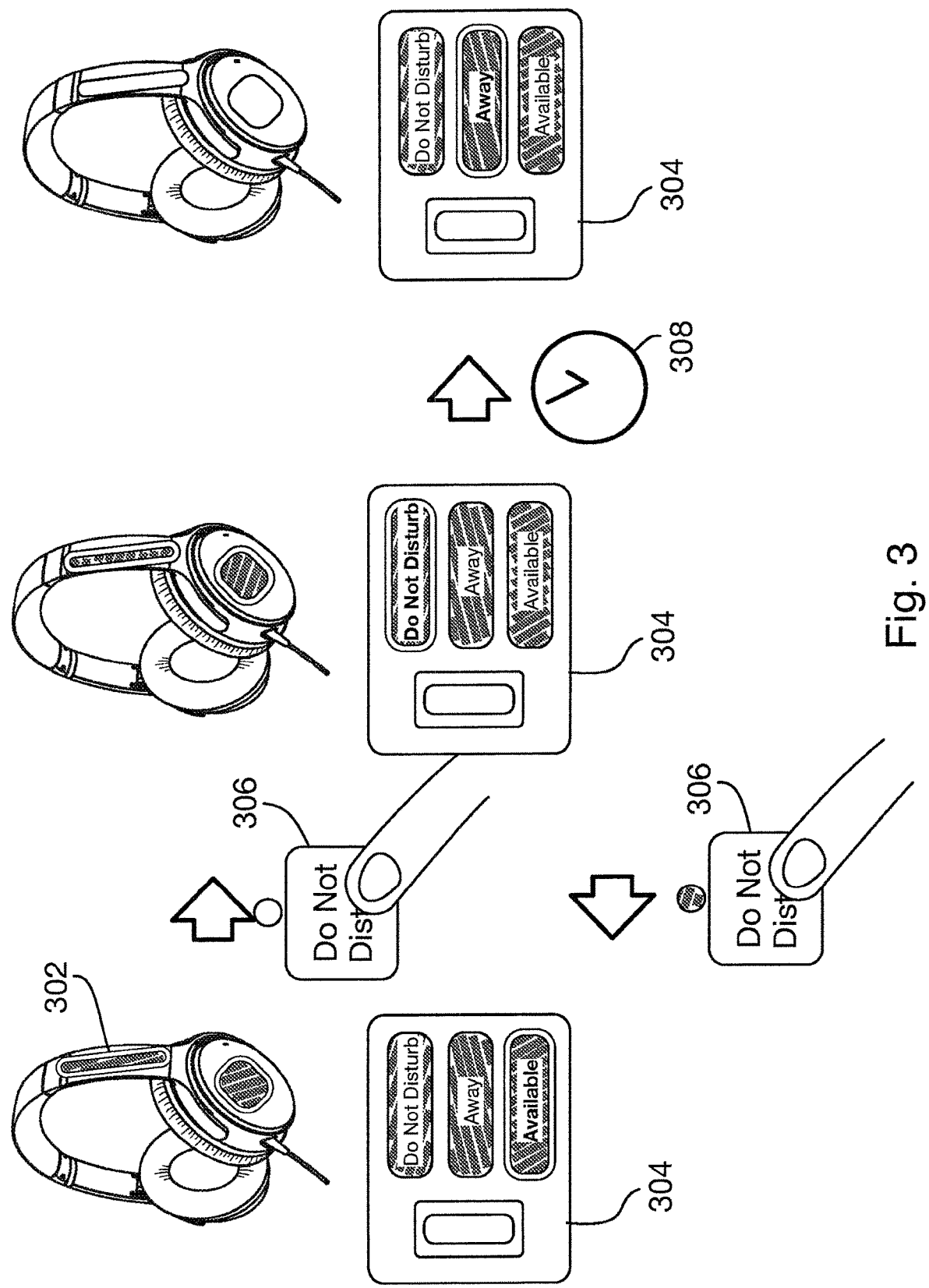

In combination with a doorbell, in some examples, a do-not-disturb indicator is provided, as shown in FIG. 3. The indicator can be a light 302 or other user interface element on the headset, integrated into the doorbell 304, or otherwise attached to something in the office environment. In the case of a light 302 on the headset, different colors (represented by angled lines in FIG. 3) may indicate status, or different blink patterns of a monochrome light may be used. The user may manually activate the do-not-disturb indicator 306 from the interface unit. In other examples, the do-not-disturb indicator controlled by the user's status on a workplace collaboration system or calendar 308, or whether they are on a call (phone, VoIP, video chat, etc.). In some cases, a third state, "away" is indicated when the user has been inactive for some amount of time (or when the user manually set such a state. In this case, an indicator on the doorbell may light up, while the indicator on the headset will turn off, since no indicator is needed to know that a user of a headset is not using it. In yet another example, the do-not-disturb indicator is automatically turned on when the user activates the masking feature of the interface, and it may be automatically canceled when the masking is turned off or the headset is doffed. In preferred embodiments, the do-not-disturb indicator is mostly automatic, but the user can always manually override the automatically-determined state.

In addition to or instead of a doorbell, a passive visitor detection system may be used to alert the user. A sensor such as passive infra-red (PIR) or an ultrasonic pinger may be provided to detect a visitor. A PIR sensor may be mounted high, such as on the ceiling, so that it has an appropriate field of view. An ultrasonic sensor may be mounted on the out-loud speaker or interface and may even share transducers with it. An infra-red beam sensor may also be used, rather than a passive sensor. Another option would be a pressure sensor in the floor mat outside the cubicle. The visitor detection may respond as soon as someone is detected behind the user or at the entrance to the workspace or it may wait for the visitor to hover a bit, so as to not falsely trigger every time someone walks by.

Whatever technology is used, detection of a visitor can automatically alert the user to a visitor's presence, in the same manner as if the visitor manually pressed the doorbell. In other examples, the detection of a visitor causes the doorbell to flash or in some other way try to get the visitor's attention so that they see the user's status (do-not-disturb, or not) and are encouraged to use the doorbell to get the user's attention.

If the doorbell is pressed or a visitor detected, the system can respond in various ways, including by muting any masking signals, muting or ducking music, sounding a chime, or switching the headset from an active noise reducing mode to an active hear-through mode (assuming that the headset/interface connection allows the interface to control headset mode). If do-not-disturb is selected, one or more of the methods of notification may be suppressed. If a visitor is going to ignore the do-not-disturb status and bother the user anyway, it is preferable to alert the user in as gentle a way as possible so they can socially manage the interruption and avoid being startled. This may be accomplished, for example, by slowly lowering the masking signal level or the noise reduction of the headphones before sounding an alert, so that the user notices the visitor without an abrupt change in the sound at their ears. In some cases, none of the methods of notification are used, and instead an indication is provided to the visitor, e.g., on the doorbell, to reinforce the do-not-disturb status.

In one product-usage scenario, when the user enables a noise masking feature of her hub her availability indicator outside her cubicle/on her headphones automatically switches to "Do Not Disturb" to let others know she needs to focus. A half hour later she is really in the zone when her co-worker drops by to see what the user is up to for lunch. He doesn't notice that her Do Not Disturb indicator is on. As a coworker walks up to the user's work area he stops and knocks. Because the user has noise masking enabled she is not aware that her co-worker is there. The intrusion sensor detects the coworker's presence and alerts the user that he is there. She gestures that she is busy so the coworker goes back to his desk to send her an email or text message instead.

Later, the user participates in a meeting through a video call. After the call, the user returns to what she was working on before the meeting. She turns on the noise-masking feature but since she just wants to mask out the noisy office she disables the Do Not Disturb indicator and it switches to green indicating she is available.

Participant ID and Voice Location Virtualization

Being in the path of call-related audio, between the source of the call and the headset or speaker, the hub can provide additional features to the user while in-call. In some examples, the hub employs voice fingerprinting to identify who is participating in a call and who is currently speaking. When the call starts, the user initiates a "Participant ID Mode" in which the hub listens to meeting participants introduce themselves. The hub creates a voice fingerprint for each person and also uses a speech-to-text routine to transcribe their introduction, associating the voice fingerprint with the name the person used. The hub may also use additional information, such as the participants listed on a meeting invitation for the call, to determine likely names of speakers and refine the speech-to-text analysis. Once all participants have introduced themselves, the user ends the setup process. During the rest of the call, the hub listens in and uses the voice fingerprints to identify when a participant speaks, and shows their name in some interface element, e.g., one built-in to the hub or in the user interface of the workstation or communications device. The device used to show the speaker identification does not need to be the same device handling the call itself.

When on a video call with more than one other person, if the PC's OS or video-conferencing software has an API that provides the location on the monitor of the window showing each person on the call, the interface can apply HRTF processing to each person's voice to approximately locate them in relative azimuth to correspond with their face on the screen. The voice of the person on the left comes from the left.

In one product-usage scenario, the user has been listening to music while working for the last hour through her headphones. Her calendar alerts her of an upcoming videoconference so she taps the meeting link in her calendar to join. As she joins the meeting her camera is enabled, the audio transitions from her music to the call, and a soft diffuse light turns on lighting her face evenly without blinding her. As everyone announces themselves, the user's hub creates a list of meeting participants so she knows who is present and who is currently speaking. The availability indicator changes to "Do Not Disturb . . . I'm On A Call".

In the next cubicle the user's co-worker is having an impromptu meeting but the remote team is not distracted by the background noise because of the noise-rejecting microphone in the user's headset. The remote team sees the user's image on the screen in the conference room and because of the hub's camera tracking, the user remains centered and at the same size even when she is moving around in his chair.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising:
  a first interface for connecting to a communications device;
  a second interface for connecting to an audio output device; and
  a processor in control of each of the interfaces, and configured to:
    route an electrical audio privacy masking signal to one of the communications device or the audio output device at a time, wherein the audio privacy masking signal is configured to reduce the loudness to a user of the apparatus of external sounds from sources other than the user, and wherein, in response to an action of a user, the audio privacy masking signal is automatically switched from being routed by the processor to one of the communications device or the audio output device to being routed by the processor to the other of the communications device or the audio output device;
    upon initiation of a multiple-participant communication session through the communication device,
      begin analyzing speech from remote participants of the session to produce a voice fingerprint for each remote participant,
      use a speech-to-text process to identify text corresponding to each participants' likely name, and
      associate the identified text with the voice fingerprint produced for each corresponding remote participant; and
    when a remote participant speaks during the communication session at a time subsequent to the time their voice fingerprint and likely name was determined, provide an indication to the user of the apparatus of the speaking participant's likely name.

2. The apparatus of claim 1, wherein the indication to the user of the apparatus of the speaking participant's likely name is outputted as text via a user interface in one of: the apparatus, the communications device, and the audio output device.

3. The apparatus of claim 1, wherein the processor is further configured to:
  access a calendar event associated with the multiple-participant communication session and determine names of participants listed on the calendar event; and
  use the names of the participants listed on the calendar event to identify text corresponding to each participants' likely name.

4. The apparatus of claim 1, wherein the communications device is integrated into the apparatus.

5. The apparatus of claim 1, wherein the audio output device is integrated into the apparatus.

6. The apparatus of claim 1, wherein at least one of the first and second interfaces is a wireless interface.

7. The apparatus of claim 1, wherein the processor is further configured to apply a head-related transfer function (HRTF) to each remote participant's speech.

8. The apparatus of claim 1, further comprising a do-not-disturb indicator in communication with the processor, wherein the processor is further configured to activate the do-not-disturb indicator upon initiation of the multiple-participant communication session.

9. The apparatus of claim 1, wherein the communications device comprises a headset, and wherein the action of the user comprises putting the headset on or taking the headset off.

10. The apparatus of claim 1, wherein the communications device comprises a headset, and wherein the processor is further configured to mute the privacy masking signal when the user takes the headset off.

11. The apparatus of claim 9, wherein the processor is configured to automatically route the privacy masking signal to the headset when the user puts the headset on and automatically route the privacy masking signal to the audio output device when the user takes the headset off.

12. The apparatus of claim 11, wherein the audio output device comprises a loudspeaker.

13. The apparatus of claim 12, wherein the processor is further configured to tune the privacy masking signal that is routed to the loudspeaker based on the user's voice, so that the user's voice is masked against eavesdropping.

* * * * *